United States Patent Office 3,316,674
Patented May 2, 1967

3,316,674
METHOD OF NEW INDUSTRIAL CULTIVATION OF UNICELLULAR GREEN ALGAE SUCH AS CHLORELLA
Minoru Shirota, Kyoto, Hiroshi Endo, Hirakata, Osaka, and Kei Nakajima, Kyoto, Japan, assignors to Kabushiki Kaisha Yakult Honsha, Tokyo, Japan
No Drawing. Filed Aug. 16, 1965, Ser. No. 480,117
Claims priority, application Japan, Sept. 11, 1964, 39/51,388
1 Claim. (Cl. 47—1.4)

This invention relates to a method for industrial cultivations of unicellular green algae such as Chlorella and Senedesmus (described as Chlorella and the like hereinafter) which have importance as the source for food, feeds, growth promoting factors for lactobacilli, drugs, chlorophyll and physiologically active factors and the like.

Chlorella and the like have been known as a photosynthetic autotrophic organism, and in general the method of pond cultivation based on the opened, circulating, outdoor system has been so far resorted to as the method for mass culture. On the other hand, however, it has been known that Chlorella and the like make so-called heterotrophic growth in the presence of organic matters.

The inventors formerly invented a method for cultivating Chlorella and the like industrially in large scale in a tank, using sugars as the energy source, without special supply of light, depending upon the heterotrophic growth. The present invention is concerned with a modified method developed from this tank culture method. Namely, the technique of so-called autotrophic growth, wherein light is supplied concomitantly, is applied to the case of heterotrophic cultivation of Chlorella and the like as described above. By the instant process, further enhancement of the rate of growth as well as the amount multiplied and harvested of Chlorella and the like which are rich in the content of coloring matters among the components of algal cell, have been facilitated.

The embodiment of the present invention is detailed in the following.

When Chlorella and the like are grown heterotrophically depending on sugars as an energy source, carbon dioxide is produced, and it has been found that the irradiation on this occasion induces photosynthetic reaction. This invention then proposes a method for effecting so-called "mixotrophic growth" industrially by allowing heterotrophy and autotrophy to exist concurrently. This method was devised on the ground of full understanding of this phenomenon.

The intensity of illumination necessary for the maximum growth of Chlorella and the like is generally considered to be above 10,000 Lux in case of cultivation by the photosynthetic autotrophic growth, and under the illumination as low as 400 Lux there occurs entirely no growth.

But is was found that the maximum growth can be attained in the heterotrophic growth method by illuminating concurrently with a light below 1,000 Lux. Even a light as weak as 10 Lux gives conspicuous effects on the growth of Chlorella. This evidences that taking concurrent metabolism in the photosynthetic system is advantageous even in heterotrophic growth. Therefore, the said mixotrophic tank culture is a still more advantageous method than not only the former method of photosynthetic autotrophic growth but also the method of heterotrophic tank culture, which has previously been discovered by the inventors.

Table 1 shows the effect of various intensity of light upon growth in case of mixotrophic growth.

TABLE 1.—RELATION BETWEEN THE INTENSITY OF ILLUMINATION AND THE AMOUNT OF GROWTH

| Intensity of illumination (Lux) | Duration of cultivation (hr.) | | | | Content of chlorophyll in the cells of algae obtained (percent) |
|---|---|---|---|---|---|
| | 48 | 96 | 144 | 192 | |
| 0 | 0.16 | 0.42 | 1.6 | 5.6 | 1.8 |
| 10 | 0.28 | 1.16 | 4.6 | 6.8 | 1.9 |
| 30 | 0.28 | 1.2 | 5.4 | 6.4 | 2.6 |
| 100 | 0.26 | 1.1 | 5.0 | 6.0 | 2.8 |
| 300 | 0.28 | 1.02 | 5.6 | 6.6 | 3.3 |
| 1,000 | 0.32 | 1.56 | 7.0 | 8.1 | 3.7 |

NOTE.—Intensity of illumination indicates the intensity of illumination on the surface of culture solution of one liter. Amount of growth is represented by gram per liter. Culture condition: after inoculation to a culture medium of inorganic salts added with 1% glucose and 0.5% yeast extract, cultivated at 30° C. with shaking.

As evident in the result of the experiments shown in Table 1, the amount of growth was influenced notably even by a light as weak as 10 Lux in contrast with the case not illuminated, and the amount of growth increased in proportion to the strength of light. From the viewpoint of the yield against sugars, the yield in the case without light illumination was 56%, whereas the yield in the case of 1,000 Lux was 81%, which is 14 times larger. The content of chlorophyl and coloring matter of the carotenoid system in the cells of algae increased in proportion to the intensity of illumination, and in the case of 1,000 Lux, the content became almost equal to that in the Chlorella obtained by the photosynthetic autotrophic growth.

It was experimentally noticeable that the illumination appeared to have an effect as the growth promoting factor regardless of the addition of amino acids to the culture medium.

The illuminating light may be an artificial light, and since even a merely weak light has such an effect, conventionally used fermentation tanks can be generally used without any large reconstitution. Illumination through sight glasses (normally two) on the top of the tank, which are equipped for inspecting culture conditions, is sufficient. In an example, illumination by two, 100 watts electric lamps per 1000 liters of culture medium through the upper sight glasses, with a distance of about 50 cm. from the light source to the surface of the culture liquid, gives an intensity of illumination of higher than about 5000 Lux at the surface of the liquid, and moreover as the culture medium is always stirred, the aim and the effect of illumination can be fully attained.

Above-mentioned culture method is effective both in case of selective isolation of strains of Chlorella and the like and also in case of industrial cultivation of these strains. A continuous method can be carried out in the isolation of strains and also in the mass production.

The features of the cultivation through mixotrophic growth are mentioned as follows:

(a) The amount of growth per unit amount of culture medium is large and the harvest is obtained economically. (The yield for the sugar is large.)

(b) The content of coloring matter in the algae becomes large.

(c) The kinds of strains of Chlorella and the like applicable to tank culture becomes numerous, making strains obtainable for the large growth amount and usable for the convenient culture conditions.

In brief, the inventors have previously revealed that the method of heterotrophic growth is far superior to the prior method of autotrophic growth (open, circulating system), but the method of mixotrophic growth which has been developed according to the present invention is by far a more advantageous industrial culture method than the tank culture method due to heterotrophic growth.

The examples of the present invention are given hereinafter.

*Example 1*

A medium was prepared by using the following components:

| | |
|---|---|
| Urea | g./l__ 1.0 |
| $MgSO_4 \cdot 7H_2O$ | g./l__ 0.25 |
| $KH_2PO_4$ | g./l__ 0.25 |
| KCl | g./l__ 0.25 |
| Fe-solution [1] and modified $A_5$ solution [2]__each ml__ | 1 |
| Glucose | g./l__ 10.0 |
| pH was adjusted to 6.0. | |

[1] Fe-solution:

| | |
|---|---|
| $FeSO_4 \cdot 7H_2O$ | g./l__ 2.0 |
| Conc $H_2SO_4$ | drops/l__ 4 |

[2] Modified $A_5$ solution:

| | G./l. |
|---|---|
| $H_3BO_3$ | 2.86 |
| $MnCl_2 \cdot 4H_2O$ | 1.81 |
| $ZnSO_4 \cdot 7H_2O$ | 0.221 |
| $MoO_3$ | 0.0177 |
| $CuSO_4 \cdot 5H_2O$ | 0.079 |
| $CoCl_2$ | 1.00 |

100 ml. of the culture medium was taken in a 500 ml. flask sealed with a cotton stopper, sterilized under a pressure of 15 lbs. for 15 minutes, inoculated with numerous strains of Chlorella previously purely isolated and cultivated on an agar medium of inorganic salts autotrophically, for each medium respectively. They were cultivated wtih shaking at 30° C., keeping the condition so that the surface of the medium was illuminated as much as 1000 Lux.

A strain showing the most active growth after 6 days cultivation was cultured in the similar procedures which were repeated more than 3 times. The culture thus obtained was used as a seed culture.

The seed culture was then inoculated in a 1 liter culture medium of above-mentioned composition (0.5 g./l.), and cultivated for 2 days with shaking at 30° C. under illumination of 1000 Lux light, and the resulting product was harvested. Yield (dry matter)—6 g./l.

In case of industrial large scale production, the culture solution in each of tanks is increased ten times successively as 4 l.→40 l.→400 l.→4000 l., and the culture obtained in the preceeding stage may be seeded to the subsequent culture. Each culture tank is equipped with a stirrer, an aeration apparatus, and a thermostat, and at the top or the side of the culture tank, a peep hole made of glass, which is resistant to heat and pressure was attached.

The culture medium of above composition was taken in the tank, sterilized under pressure, cooled, and inoculated with a seed culture, and then cultivated with stirring at 30° C. for about two days, introducing a small quantity of sterilized air. During the culture, illumination was applied successively through the peep hole. In case of a 4000 l. culture, it was illuminated by two, 100 watts electric lamps from the top of the tank.

The yield from the final culture of 4000 l. was 20 kg. as dry matter.

*Example 2*

A culture medium was prepared by using the following components:

| | |
|---|---|
| Urea | g./l__ 2.0 |
| $MgSO_4 \cdot 7H_2O$ | g./l__ 2.0 |
| $KH_2PO_4$ | g./l__ 3.0 |
| Fe-solution and modified $A_5$ solution [1] ___each ml__ | 5.0 |
| Glucose | g./l__ 10.0 |
| Casamino acid | g./l__ 5.0 |
| pH was adjusted to 6.0. | |

[1] The compositions of Fe-solution and modified $A_5$ solution were identical with those in Example 1.

100 ml. of the above culture medium was taken in a 500 ml. flask sealed with cotton stopper, sterilized under a pressure of 15 lbs. for 15 minutes, inoculated respectively with strains of Chlorella previously purely isolated and cultivated autotrophically on an agar medium of inorganic salts with shaking at 30° C. under illumination as strong as 1000 Lux at the surface of the culture. After 6 days cultivation, the grown strain was used as a seed and said procedure was repeated more than three times to multiply the algae product. The newly grown strain was then used as a seed culture in a culture medium prepared by mixing the following components.

| | |
|---|---|
| Urea | g./l__ 2.0 |
| $MgSO_4 \cdot 7H_2O$ | g./l__ 2.0 |
| $KH_2PO_4$ | g./l__ 3.0 |
| KCl | g./l__ 0.25 |
| Fe-solution and modified $A_5$ solution ___each ml__ | 5.0 |
| Glucose | g./l__ 50.0 |
| Extracts from separated fat soy bean ($N=400$ mg.) | ml__ 50 |

3 grams of the seed culture was inoculated to one liter culture medium mentioned above and cultivated with shaking at 30° C. being illuminated by 1000 Lux light, and after 36 hours, a urea solution, which was previously prepared and sterilized and contained urea of 3 grams per 10 ml., was added aseptically to the culture medium, and after further cultivation for 12 hours, the algae were harvested. Yield (dry matter)—40 g./l.

In case of large scale cultivation, the successive scale-up process as shown in Example 1 was carried out intermittently, and at the stage of final culture of 4000 l., an urea solution, which was previously prepared by dissolving 12 kgs. of urea in 50 liters water and sterilized, was aseptically added to the culture medium after passed about 36 hours from the initiation of cultivation. The cultivation was further continued for 12 hours, and then the resulting algae were harvested. Yield (dry matter)—148 Kg./4t.

What we claim is:

A method for industrial cultivation of unicellular green algae from the group of Chlorella and Senedesmus which comprises the steps of inoculating unicellular green algae from the group of Chlorella and Senedesmus to a culture medium which comprises inorganic salts and a member of the group of sugars and organic acids, cultivating with shaking at a suitable temperature, illuminating continuously and in the absence of externally supplied carbon dioxide for several days, thereafter selectively isolating strains which have grown abundantly, repeating the culture of said isolated strains several times in the previously indicated manner, selecting a strain showing the largest multiplication as a seed strain, inoculating the said seed strain to a sterilized culture medium having the same composition as indicated above, and then effecting a pure culture at a suitable temperature with shaking or aeration stirring under continuous light illumination without externally supplying carbon dioxide to the culture medium.

References Cited by the Examiner

UNITED STATES PATENTS 2,949,700   8/1960   Kathrein _____ 47—1.4

ANTONIO F. GUIDA, *Acting Primary Examiner.*

ABRAHAM G. STONE, ROBERT E. BAGWILL,
*Examiners.*